United States Patent [19]
Rezaiifar et al.

[11] Patent Number: 6,167,270
[45] Date of Patent: Dec. 26, 2000

[54] SOFT HANDOFF IN THE TRANSMISSION OF SUPPLEMENTAL CHANNEL DATA

[75] Inventors: Ramin Rezaiifar; Yu-Cheun Jou; Edward G. Tiedemann, Jr., all of San Diego, Calif.

[73] Assignee: Qualcomm Inc., San Diego, Calif.

[21] Appl. No.: 09/503,871

[22] Filed: Feb. 14, 2000

Related U.S. Application Data

[62] Division of application No. 08/931,535, Sep. 16, 1997.

[51] Int. Cl.$^7$ ........................................ H04Q 7/20
[52] U.S. Cl. .................... 455/442; 455/455; 455/62; 370/331
[58] Field of Search ...................... 455/436, 437, 455/442, 438, 439, 62, 63, 455, 226.2, 513, 525; 370/331, 332

[56] References Cited

U.S. PATENT DOCUMENTS 5,267,261  11/1993  Blakeney, II et al. ............... 455/442
5,987,326  11/1999  Tiedemann, Jr. et al. ............ 455/442
6,038,450   3/2000  Brink et al. ......................... 455/442

*Primary Examiner*—Nguyen Vo
*Assistant Examiner*—Lester G. Kincaid
*Attorney, Agent, or Firm*—Philip Wadsworth; Thomas R. Rouse

[57] ABSTRACT

A channel structure for use in communication systems. Two sets of physical channels, one for the forward link and another for the reverse link, are utilized to facilitate communication of a variety of logical channels. The physical channels comprise data and control channels. In the exemplary embodiment, the data channels comprise fundamental channels which are used to transmit voice traffic, data traffic, high speed data, and other overhead information and supplemental channels which are used to transmit high speed data. The fundamental channels can be released when the remote stations are idle to more fully utilized the available capacity. The control channels are used to transmit paging and control messages and scheduling information.

4 Claims, 14 Drawing Sheets

SOFT HANDOFF IN THE TRANSMISSION OF SUPPLEMENTAL CHANNEL DATA

CROSS REFERENCE

This application is a divisional application of application Ser. No. 08/931,535, filed Sep. 16, 1997, entitled "Channel Structure For Communication Systems" which is currently pending.

BACKGROUND OF THE INVENTION

I. Field of the Invention

The present invention relates to communications. More particularly, the present invention relates to a channel structure for communication systems.

II. Description of the Related Art

The use of code division multiple access (CDMA) modulation techniques is one of several techniques for facilitating communications in which a large number of system users are present. Although other techniques such as time division multiple access (TDMA) and frequency division multiple access (FDMA) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The CDMA system can be designed to conform to the "TIA/EIA/IS-95 Mobile Station-Base Station Compatibility Standard for Dual-Mode Wideband Spread Spectrum Cellular System", hereinafter referred to as the IS-95 standard. Another code division multiple access communication system includes the GLOBALSTAR communication system for world wide communication utilizing low earth orbiting satellites.

CDMA communication systems are capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data and voice data are partitioned into traffic channel frames which are 20 msec in duration. The data rate of each traffic channel frame is variable and can be as high as 14.4 Kbps.

In the CDMA system, communications between users are conducted through one or more base stations. A first user on one remote station communicates to a second user on a second remote station by transmitting data on the reverse link to a base station. The base station receives the data and can route the data to another base station. The data is transmitted on the forward link of the same base station, or a second base station, to the second remote station. The forward link refers to transmission from the base station to a remote station and the reverse link refers to transmission from the remote station to a base station. In IS-95 systems, the forward link and the reverse link are allocated separate frequencies.

The remote station communicates with at least one base station during a communication. CDMA remote stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a remote station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in copending U.S. Pat. No. 5,933,787 entitled "METHOD AND APPARATUS FOR PERFORMING HANDOFF BETWEEN SECTORS OF A COMMON BASE STATION", filed Dec. 11, 1996, assigned to the assignee of the present invention and incorporated by reference herein.

Given the growing demand for wireless data applications, the need for very efficient wireless data communication systems has become increasingly significant. An exemplary communication system which is optimized for data transmission is described in detail in copending U.S. Pat. No. 5,930,230 entitled "HIGH DATA RATE CDMA WIRELESS COMMUNICATION SYSTEM", filed May 28,1996, assigned to the assignee of the present invention, and incorporated by reference herein. The system disclosed in U.S. Pat. No. 5,930,230 is a variable rate communication system capable of transmitting at one of a plurality of data rates.

A significant difference between voice services and data services is that the former requires a fixed and common grade of service (GOS) for all users. Typically, for digital systems providing voice services, this translates into a fixed and equal data rate for all users and a maximum tolerable value for the error rates of the speech frames, independent of the link resource. For the same data rate, a higher allocation of resource is required for users having weaker links. This results in an inefficient use of the available resource. In contrast, for data services, the GOS can be different from user to user and can be a parameter optimized to increase the overall efficiency of the data communication system. The GOS of a data communication system is typically defined as the total delay incurred in the transfer of a data message.

Another significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system.

The parameters which measure the quality and effectiveness of a data communication system are the total delay required to transfer a data packet and the average throughput rate of the system. Total delay does not have the same impact in data communication as it does for voice communication, but it is an important metric for measuring the quality of the data communication system. The average throughput rate is a measure of the efficiency of the data transmission capability of the communication system.

A communication system designed to optimize transmission of data services and voice services needs to address the particular requirements of both services. The present invention provides a channel structure which facilitate transmissions of data and voice services.

SUMMARY OF THE INVENTION

The present invention is a novel and improved channel structure for use in communication systems. The present invention provides for two sets of physical channels, one for the forward link and another for the reverse link, to facilitate communication of a variety of logical channels. The physical channels comprise data and control channels. In the exemplary embodiment, the data channels comprise fundamental channels which are used to transmit voice traffic, data traffic, high speed data, and other overhead information and supplemental channels which are used to transmit high speed data. In the exemplary embodiment, the forward and reverse traffic channels can be released when the remote stations are idle to more fully utilize the available capacity. The control channels are used to transmit control messages and scheduling information.

It is an object of the present invention to provide a channel structure which supports voice services and data services. In the exemplary embodiment, the traffic channels comprise fundamental and supplemental channels. The fundamental channels can be used to transmit voice traffic, data traffic, high speed data, and signaling messages. The supplemental channels can be used to transmit high speed data. In the exemplary embodiment, the fundamental and supplemental channels can be transmitted concurrently. In the exemplary embodiment, to improve reliability (especially for signaling messages) the fundamental channels are supported by soft handoff.

It is another object of the present invention to provide a channel structure which maximizes the throughput rate of a communication system. In the exemplary embodiment, the supplemental channels transmit at one of a plurality of data rates. The data rate is selected based on a set of parameters which can comprise the amount of information to be transmitted, the transmit power available for the remote station, and the required energy-per-bit. The data rate is assigned by a scheduler such that the system throughput rate is maximized.

It is yet another object of the present invention to provide a channel structure which optimizes transmissions from multi-cell and multi-carrier. In the exemplary embodiment, the power levels of all base stations in the active set of the remote station are measured periodically during a communication. The multi-cell Δ power levels are transmitted to the base stations which use the information to transmit high speed data from the "best" set of base stations, thereby increasing capacity. In addition, the power levels of all carriers are also measured periodically and the multi-carrier Δ power levels are transmitted to the base stations. The base stations can use the information to increase the power level of weak carriers or to reassign the remote station to a new carrier assignment.

It is yet another object of the present invention to provide a channel structure which minimizes power consumption and increase system capacity. In the exemplary embodiment, the remote station operates in one of three operating modes which comprise the traffic channel mode, the suspended mode, and the dormant mode. If the period of inactivity since the termination of the last transmission exceeds a first predetermined threshold, the remote station is placed in the suspended mode. In the exemplary embodiment, in the suspended mode, the traffic channel is released but the state information is retained by both the remote station and the base station and the remote station monitors the paging channel in the non-slotted mode. Thus, the remote station can be brought back to the traffic channel mode in a short time period. If the period of inactivity exceeds a second predetermined threshold, the remote station is placed in the dormant mode. In the exemplary embodiment, in the dormant mode, the state information is not retained by neither the remote station nor the base station but the remote station continues to monitor the paging channel in the slotted mode for paging messages.

It is yet another object of the present invention to provide a channel structure which minimizes processing delay for high speed data transmissions. In the exemplary embodiment, the control data are transmitted over control frames which are a fraction of the traffic channel frame. In the exemplary embodiment, the data rate request by the remote station and other information are transmitted by the remote station using a control channel frame format which minimizes the processing delay between the time a data rate request is made to the time of actual transmission at the assigned data rate. In addition, the present invention provides for erasure-indicator-bits for both the forward and reverse links which can be used in place of NACK RLP frames defined by the IS-707 standard.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. System Description

Figure 1:
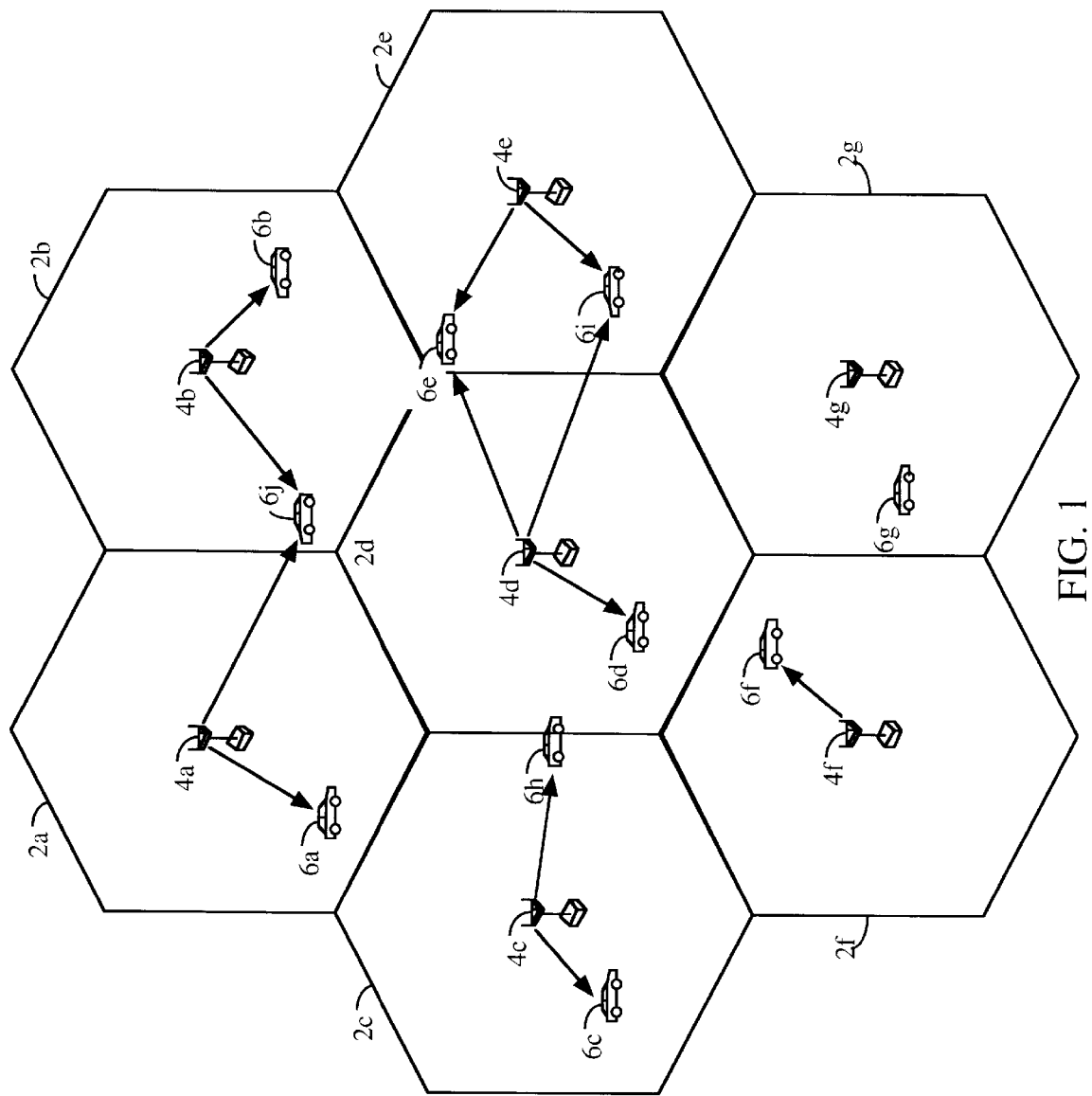
FIG. 1 is a diagram of an exemplary communication system of the present invention.

Referring to the figures, FIG. 1 represents an exemplary communication system. One such system is the CDMA communication system which conforms to the IS-95 standard. Another such system is described in the aforementioned U.S. Pat .No. 5,930,230. The communication system comprises multiple cells 2a–2g. Each cell 2 is serviced by a corresponding base station 4. Various remote stations 6 are dispersed throughout the communication system. In the exemplary embodiment, each of remote stations 6 communicates with zero or more base station 4 on the forward link at each traffic channel frame or frame. For example, base station 4a transmits to remote stations 6a and 6j, base station 4b transmits to remote stations 6b and 6j, and base station 4c transmits to remote stations 6c and 6h on the forward link at frame i. As shown by FIG. 1, each base station 4 transmits data to zero or more remote stations 6 at any given moment. In addition, the data rate can be variable and can be dependent on the carrier-to-interference ratio (C/I) as measured by the receiving remote station 6 and the required energy-per-bit-to-noise ratio ($E_b/N_0$). The reverse link transmissions from remote stations 6 to base stations 4 are not shown in FIG. 1 for simplicity.

Figure 2:
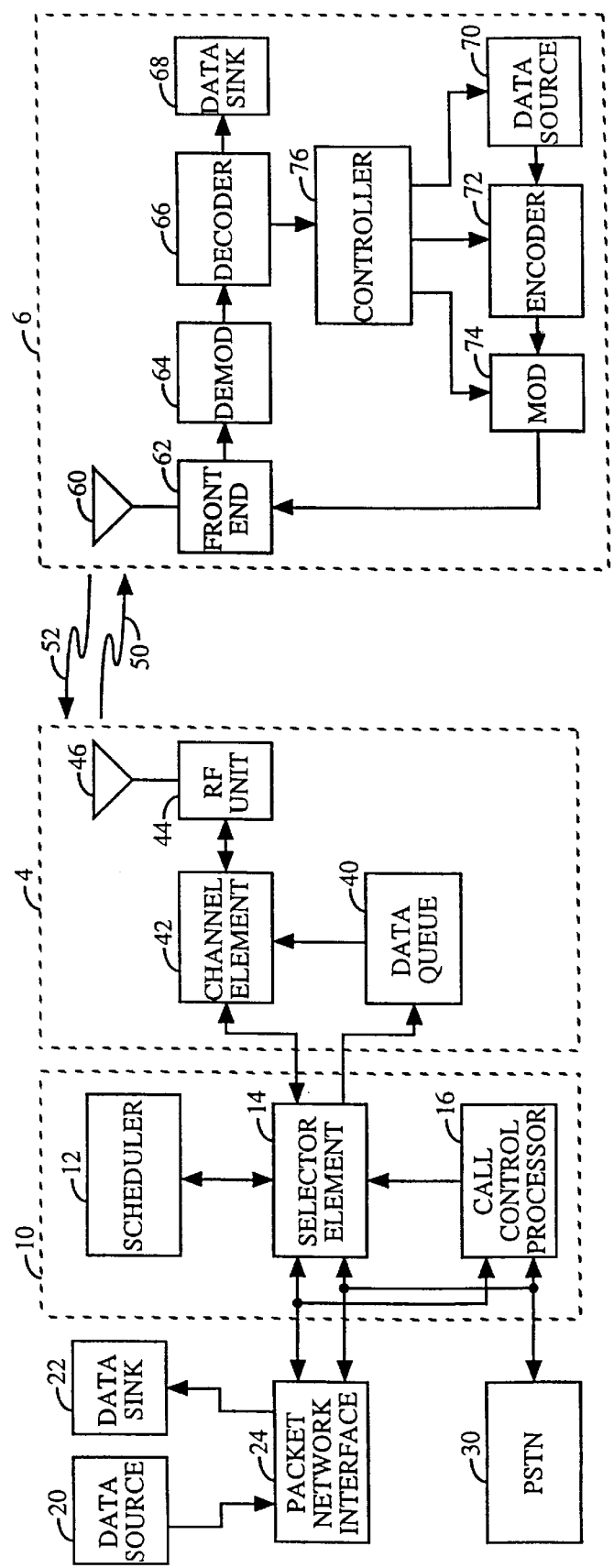
FIG. 2 is a block diagram illustrating the basic subsystems of an exemplary communication system of the present invention.

A block diagram illustrating the basic subsystems of an exemplary communication system is shown in FIG. 2. Base station controller 10 interfaces with packet network interface 24, PSTN 30, and all base stations 4 in the communication system (only one base station 4 is shown in FIG. 2 for simplicity). Base station controller 10 coordinates the communication between remote stations 6 in the communication system and other-users connected to packet network interface 24 and PSTN 30. PSTN 30 interfaces with users through the standard telephone network (not shown in FIG. 2);

Base station controller 10 contains many selector elements 14, although only one is shown in FIG. 2 for simplicity. One selector element 14 is assigned to control the communication between one or more base stations 4 and one remote station 6. If selector element 14 has not been assigned to remote station 6, call control processor 16 is informed of the need to page remote station 6. Call control processor 16 then directs base station 4 to page remote station 6.

Data source 20 contains the data which is to be transmitted to remote station 6. Data source 20 provides the data to packet network interface 24. Packet network interface 24 receives the data and routes the data to selector element 14. Selector element 14 sends the data to each base station 4 in communication with remote station 6. In the exemplary embodiment, each base station 4 maintains data queue 40 which contains the data to be transmitted to remote station 6.

The data is sent, in data packets, from data queue 40 to channel element 42. In the exemplary embodiment, on the forward link, a data packet refers to a fixed amount of data to be transmitted to the destination remote station 6 within one frame. For each data packet, channel element 42 inserts the necessary control fields. In the exemplary embodiment, channel element 42 CRC encodes the data packet and control fields and inserts a set of code tail bits. The data packet, control fields, CRC parity bits, and code tail bits comprise a formatted packet. In the exemplary embodiment, channel element 42 encodes the formatted packet and interleaves (or reorders) the symbols within the encoded packet. In the exemplary embodiment, the interleaved packet is scrambled with a long PN code, covered with a Walsh cover, and spread with the short $PN_I$ and $PN_Q$ codes. The spread data is provided to RF unit 44 which quadrature modulates, filters, and amplifies the signal. The forward link signal is transmitted over the air through antenna 46 on forward link 50.

At remote station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the short $PN_I$ and $PN_Q$ codes, decovered with the Walsh cover, and descrambled with the long PN code. The demodulated data is provided to decoder 66 which performs the inverse of the signal processing functions done at base station 4, specifically the de-interleaving, decoding, and CRC check functions. The decoded data is provided to data sink 68.

The communication system supports data and message transmissions on the reverse link. Within remote station 6, controller 76 processes the data or message transmission by routing the data or message to encoder 72. In the exemplary embodiment, encoder 72 formats the message consistent with the blank-and-burst signaling data format described in the aforementioned U.S. Pat. No. 5,504,773. Encoder 72 then generates and appends a set of CRC bits, appends a set of code tail bits, encodes the data and appended bits, and reorders the symbols within the encoded data. The interleaved data is provided to modulator (MOD) 74.

Modulator 74 can be implemented in many embodiments. In the first embodiment, the interleaved data is covered with a Walsh code which identifies the data channel assigned to remote station 6, spread with a long PN code, and further spread with the short PN codes. The spread data is provided to a transmitter within front end 62. The transmitter modulates, filters, amplifies, and transmits the reverse link signal over the air, through antenna 60, on reverse link 52.

In the second embodiment, modulator 74 functions in the same manner as the modulator of an exemplary CDMA system which conforms to the IS-95 standard. In this embodiment, modulator 74 maps the interleaved bits into another signal space using Walsh code mapping. Specifically, the interleaved data is grouped into groups of six bits. The six bits are mapped to a corresponding 64-bits Walsh sequence. Modulator 74 then spreads the Walsh sequence with a long PN code and the short PN codes. The spread data is provided to a transmitter within front end 62 which functions in the manner described above.

For both embodiments, at base station 4, the reverse link signal is received by antenna 46 and provided to RF unit 44. RF unit 44 filters, amplifies, demodulates, and quantizes the signal and provides the digitized signal to channel element 42. Channel element 42 despreads the digitized signal with the short PN codes and the long PN code. Channel element 42 also performs the Walsh code mapping or decovering, depending on the signal processing performed at remote station 6. Channel element 42 then reorders the demodulated data, decodes the de-interleaved data, and performs the CRC check function. The decoded data, e.g. the data or message, is provided to selector element 14. Selector element 14 routes the data and message to the appropriate destination (e.g., data sink 22).

The hardware, as described above, supports transmissions of data, messaging, voice, video, and other communications over the forward link. Other hardware architecture can be designed to support variable rate transmissions and are within the scope of the present invention.

Scheduler 12 connects to all selector elements 14 within base station controller 10. Scheduler 12 schedules high speed data transmissions on the forward and reverse links. Scheduler 12 receives the queue size, which is indicative of the amount of data to be transmitted and other pertinent information which is described below. Scheduler 12 schedules data transmissions to achieve the system goal of maximum data throughput while conforming to system constraints.

As shown in FIG. 1, remote stations 6 are dispersed throughout the communication system and can be in communication with zero or more base stations 4. In the exemplary embodiment, scheduler 12 coordinates the forward and reverse link high speed data transmissions over the entire communication system. A scheduling method and apparatus for high speed data transmission are described in detail in U.S. patent application Ser. No. 08/798,951, entitled "METHOD AND APPARATUS FOR FORWARD LINK RATE SCHEDULING", filed Feb. 11, 1997, assigned to the assignee of the present invention and incorporated by reference herein.

II. Forward Link Channels

Figure 3:
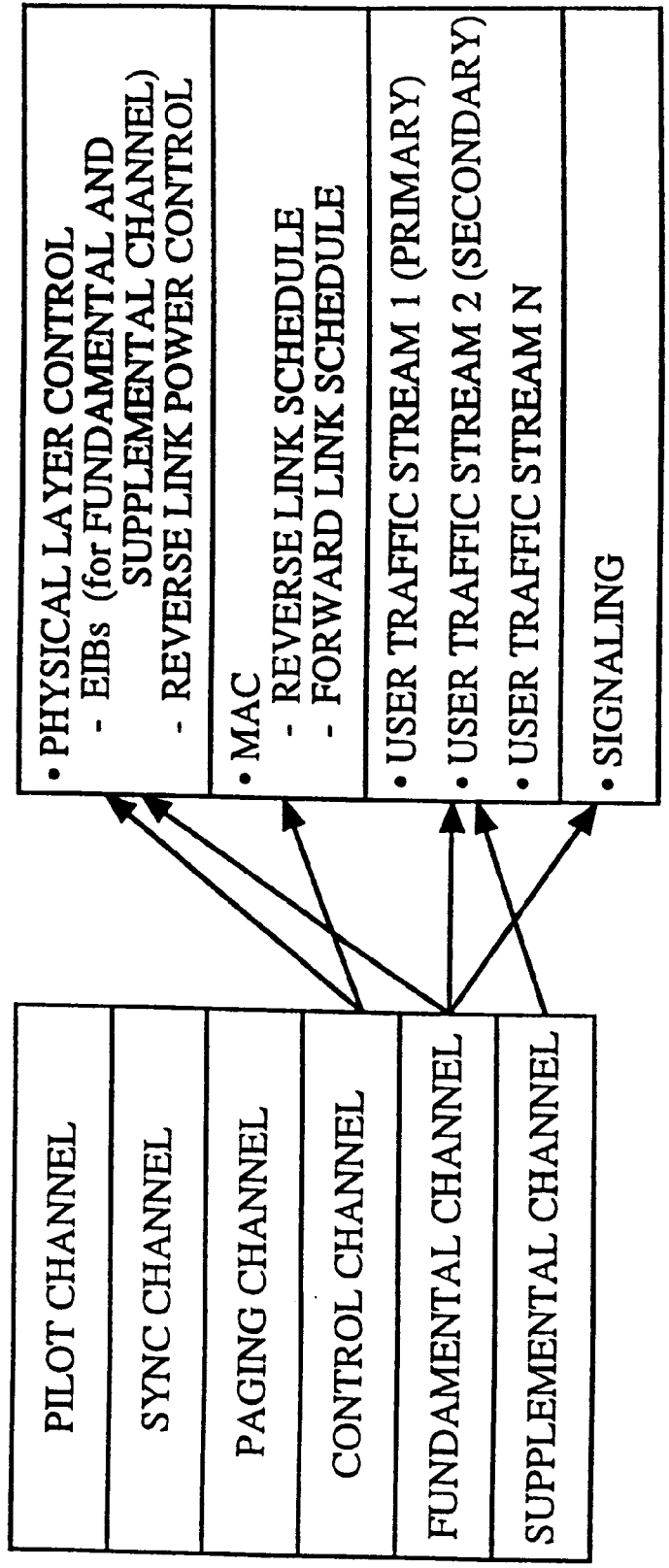
FIG. 3 is an exemplary diagram illustrating the relationship between the physical and logical channels on the forward link.

In the exemplary embodiment, the forward link comprises the following physical channels : pilot channel, sync channel, paging channel, fundamental channel, supplemental channel, and control channel. The forward link physical channels facilitate transmissions of a variety of logical channels. In the exemplary embodiment, the forward link logical channel comprises : the physical layer control, media access control (MAC), user traffic stream, and signaling. A diagram illustrating the relationship between the physical and logical channels on the forward link is shown in FIG. 3. The forward link logical channels are further described below.

III. Forward Pilot Channel

In the exemplary embodiment, the forward pilot channel comprises an unmodulated signal which is used by remote stations 6 for synchronization and demodulation. In the exemplary embodiment, the pilot channel is transmitted at all times by base station 4.

IV. Forward Sync Channel

In the exemplary embodiment, the forward sync channel is used to transmit system timing information to remote stations 6 for initial time synchronization. In the exemplary embodiment, the sync channel is also used to inform remote stations 6 of the data rate of the paging channel. In the exemplary embodiment, the structure of the sync channel can be similar to that of the IS-95 system.

V. Forward Paging Channel

In the exemplary embodiment, the forward paging channel is used to transmit system overhead information and specific messages to remote stations 6. In the exemplary embodiment, the structure of the paging channel can be similar to that of the IS-95 system. In the exemplary embodiment, the paging channel supports slotted mode paging and non-slotted mode paging as defined by the IS-95 standard. Slotted and non-slotted mode paging is described in detail in U.S. Pat. No. 5,392,287, entitled "METHOD AND APPARATUS FOR REDUCING POWER CONSUMPTION IN A MOBILE COMMUNICATIONS RECEIVER", issued Feb. 21, 1995, assigned to the assignee of the present invention and incorporated by reference herein.

VI. Forward Fundamental Channel

In the exemplary embodiment, forward traffic channels are used to transmit voice, data, and signaling messages from base stations 4 to remote stations 6 during a communication. In the exemplary embodiment, the forward traffic channels comprise fundamental channels and supplemental channels. Fundamental channels can be used to transmit voice traffic, data traffic, high speed data traffic, signaling traffic, physical layer control messages, and MAC information as shown in FIG. 3. In the exemplary embodiment, supplemental channels are only used to transmit high speed data.

In the exemplary embodiment, the fundamental channel is a variable rate channel which can be used in one of two modes: the dedicated mode and the shared mode. In the dedicated mode, the fundamental channel is used to transmit voice traffic, IS-707 data traffic, high speed data traffic, and signaling traffic. In the exemplary embodiment, in the dedicated mode, the signaling information is transmitted via dim-and-burst or blank-and-burst format as described in the aforementioned U.S. Pat. No. 5,504,773.

Alternatively, if remote station 6 does not have an active circuit switched service (e.g., voice or fax), the fundamental channel may operate in the shared mode. In the shared mode, the fundamental channel is shared among a group of remote stations 6 and the forward control channel is used to indicated to the remote station 6 when to demodulate the assigned fundamental channel.

The shared mode increases the capacity of the forward link. When no voice or circuit-switched data service is active, using a dedicated fundamental channel is inefficient because the fundamental channel is under-utilized by intermittent packet data services and signaling traffic. For example, the fundamental channel may be used to transmit the TCP acknowledgments. In order to minimize the transmission delay in the delivery of the signaling messages and data traffic, the transmission rate of the fundamental channel is not reduced significantly. Several under-utilized fundamental channels can adversely affect the performance of the system (e.g., causing reduction in the data rate of the high speed users).

In the exemplary embodiment, the use of the fundamental channel in the shared mode for a particular remote station 6 is indicated by an indicator bit sent on the forward control channel. This indicator bit is set for all remote stations 6 in the group when a broadcast message is sent on the shared signaling channel. Otherwise, this indicator bit is set only for the particular remote station 6 for which a traffic channel frame is transmitted on the next frame.

VII. Forward Supplemental Channel

In the exemplary embodiment, the supplemental channel is used to support high speed data services. In the exemplary embodiment, the supplemental channel frame can be transmitted using one of a plurality of data rates and the data rate used on the supplemental channel is transmitted to the receiving remote station 6 by signaling (e.g., forward link schedule) on the control channel. Thus, the data rate on the supplemental channel does not need to be dynamically determined by the receiving remote station 6. In the exemplary embodiment, the Walsh codes used for the supplemental channel are communicated to remote stations 6 via the logical signaling channel which is transmitted on the forward fundamental channel.

VIII. Forward Control Channel

In the exemplary embodiment, the control channel is a fixed rate channel associated with each remote station 6. In the exemplary embodiment, the control channel is used to transmit power control information and short control messages for the forward and reverse link schedule (see FIG. 3). The scheduling information comprises the data rate and the transmission duration which have been allocated for the forward and reverse supplemental channels.

The usage of the fundamental channel can be regulated by signaling channel frames which are transmitted on the control channel. In the exemplary embodiment, allocation of the logical signaling channel frames is performed by an indicator bit within the control channel frame. The process fundamental indicator bit informs remote station 6 whenever there is information directed to remote station 6 on the fundamental channel in the next frame.

The control channel is also used to transmit reverse power control bits. The reverse power control bits direct remote station 6 to increase or decrease its transmission power such that the required level of performance (e.g., as measured by the frame error rate) is maintained while minimizing interference to neighboring remote stations 6. An exemplary method and apparatus for performing reverse link power control is described in detail U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein. In the exemplary embodiment, the reverse power control bits are transmitted on the control channel every 1.25 msec. To increase capacity and minimize interference, control channel frames are transmitted on the control channel only if there is scheduling or control information available for remote station 6. Otherwise, only power control bits are transmitted on the control channel.

In the exemplary embodiment, the control channel is supported by soft handoff to increase reliability in the reception of the control channel. In the exemplary embodiment, the control channel is placed in and out of soft handoff in the manner specified by the IS-95 standard. In the exemplary embodiment, to expedite the scheduling process for the forward and reverse links, the control frames are each one quarter of the traffic channel frame, or 5 msec for 20 msec traffic channel frames.

IX. Control Channel Frame Structure

The exemplary control channel frame formats for the forward and reverse link schedules are shown in Table 1 and Table 2, respectively. Two separate scheduling control channel frames, one for the forward link and another for the reverse link, allow for independent forward and reverse link scheduling.

In the exemplary embodiment, as shown in Table 1, the control channel frame format for the forward link schedule comprises the frame type, the assigned forward link rate, and the duration of the forward link rate assignment. The frame type indicates whether the control channel frame is for the forward link schedule, the reverse link schedule, the supplemental channel active set, or the erasure-indicator-bit (EIB) and fundamental frame indicator. Each of these control channel frame formats is discussed below. The forward link rate indicates the assigned data rate for the upcoming data transmission and the duration field indicates the duration of the rate assignment. The exemplary number of bits for each field is indicated in Table 1, although different number of bits can be used and are within the scope of the present invention.

TABLE 1

| Description | # of Bits |
|---|---|
| Frame Type | 2 |
| Forward Link Rate | 4 |
| Duration of Forward Link Rate Assignment | 4 |
| Total | 10 |

In the exemplary embodiment, as shown in Table 2, the control channel frame format for the reverse link schedule comprises the frame type, the granted reverse link rate, and the duration of the reverse link rate assignment. The reverse link rate indicates the data rate which has been granted for the upcoming data transmission. The duration field indicates the duration of the rate assignment for each of the carriers.

TABLE 2

| Description | # of Bits |
|---|---|
| Frame Type | 2 |
| Reverse Link Rate (Granted) | 4 |
| Duration of Reverse Link Rate Assignment | 12 (4 per carrier) |
| Total | 18 |

In the exemplary embodiment, base station 4 can receive reports from remote station 6 indicating the identity of the strongest pilot within the active set of remote station 6 and all other pilots in the active set which are received within a predetermined power level (ΔP) of the strongest pilot. This is discussed in detail below. In response to this power measurement report, base station 4 can send a control channel frame on the control channel to identify a modified set of channels from which remote station 6 is to receive supplemental channels. In the exemplary embodiment, the code channels corresponding to the supplemental channels for all members of the active set are transmitted to remote station 6 via signaling messages.

The exemplary control channel frame format that is used by base station 4 to identify the new set of base stations 4 from which supplemental channel frames are transmitted is shown in Table 3. In the exemplary embodiment, this control channel frame comprises the frame type and the supplemental active set. In the exemplary embodiment, the supplemental active set field is a bit-map field. In the exemplary embodiment, a one in position i of this field indicates that supplemental channel is transmitted from the i-th base station 4 in the active set.

TABLE 3

| Description | # of Bits |
|---|---|
| Frame Type | 2 |
| Supplemental Active Set | 6 |
| Total | 8 |

The exemplary control channel frame format used to transmit the process fundamental channel indicator bit and the EIBs is shown in Table 4. In the exemplary embodiment, this control channel frame comprises the frame type, the fundamental and supplemental channel EIBs, and the process fundamental channel bit. The fundamental EIB indicates whether a previously received reverse link fundamental channel frame was erased. Similarly, the supplemental EIB indicates whether a previously received reverse link supplemental channel frame was erased. The process fundamental channel bit (or the indicator bit) informs remote station 6 to demodulate the fundamental channel for information.

TABLE 4

| Description | # of Bits |
|---|---|
| Frame Type | 2 |
| EIB for Reverse Fundamental Channel | 1 |
| EIB for Reverse Supplemental Channel | 1 |
| Process Fundamental Channel | 1 |
| Total | 5 |

X. Reverse Link Channels

Figure 4:
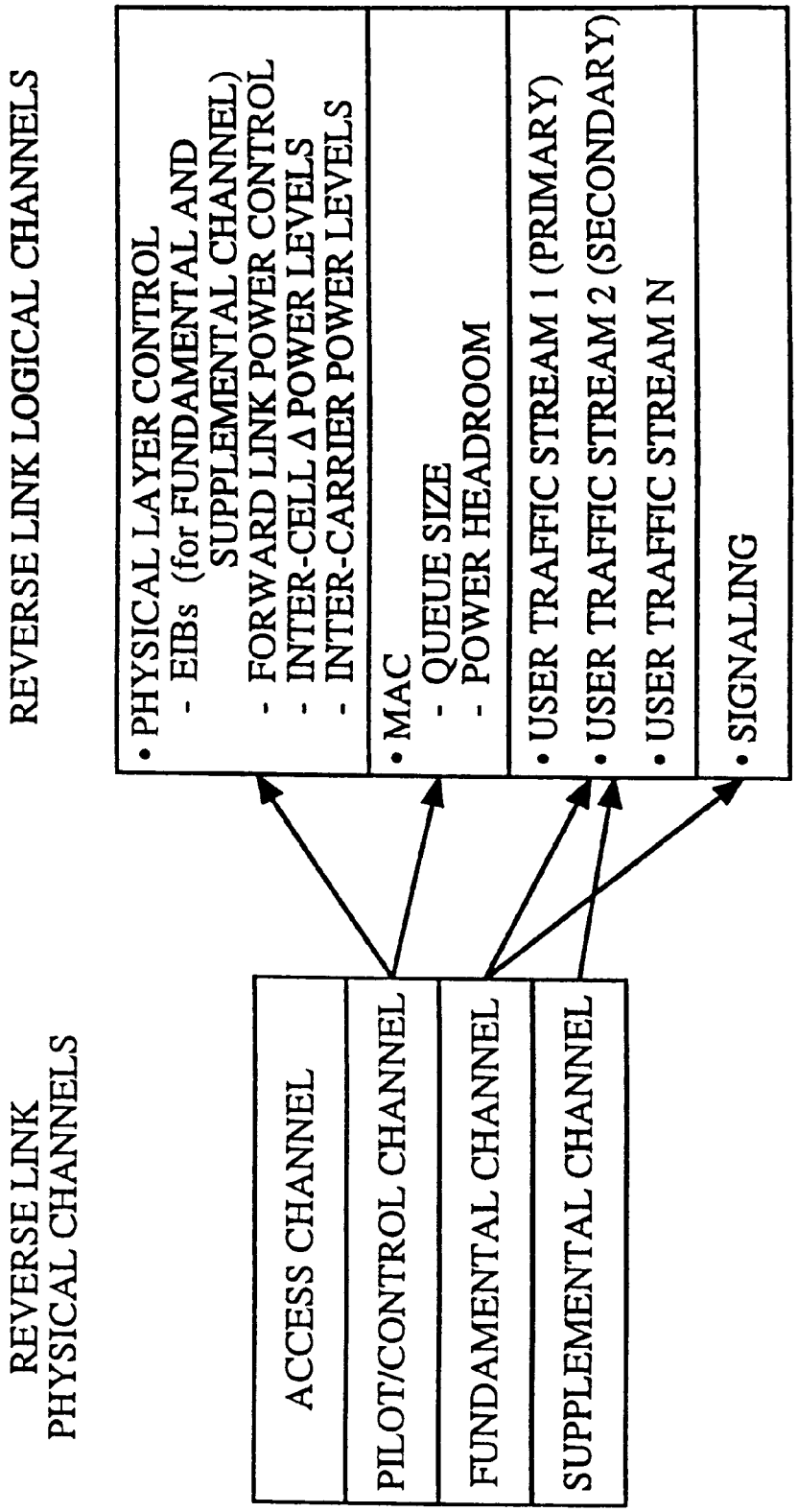
FIG. 4 is an exemplary diagram illustrating the relationship between the physical and logical channels on the reverse link.

In the exemplary embodiment, the reverse link comprises the following physical channels: access channel, pilot/control channel, fundamental channel, and supplemental channel. In the exemplary embodiment, the reverse link physical channels facilitate transmissions of a variety of logical channels. The reverse link logical channels comprise : the physical layer control, MAC, user traffic stream, and signaling. A diagram illustrating the relationship between the physical and logical channels on the reverse link is shown in FIG. 4. The reverse link logical channels are further described below.

XI. Reverse Access Channel

In the exemplary embodiment, the access channel is used by remote stations 6 to send origination message to base station 4 to request a fundamental channel. The access channel is also used by remote station 6 to respond to paging messages. In the exemplary embodiment, the structure of the access channel can be similar to that of the IS-95 system.

XII. Reverse Fundamental Channel

In the exemplary embodiment, reverse traffic channels are used to transmit voice, data, and signaling messages from remote stations 6 to base stations 4 during a communication. In the exemplary embodiment, the reverse traffic channels comprise fundamental channels and supplemental channels. Fundamental channels can be used to transmit voice traffic, IS-707 data traffic, and signaling traffic. In the exemplary embodiment, supplemental channels are only used to transmit high speed data.

In the exemplary embodiment, the frame structure of the reverse fundamental channel is similar to that of the IS-95 system. Therefore, the data rate of the fundamental channel can vary dynamically and a rate determination mechanism is utilized to demodulate the received signal at base station 4. An exemplary rate determination mechanism is disclosed in copending U.S. Pat. No. 5,566,206, entitled "METHOD AND APPARATUS FOR DETERMINING DATA RATE OF TRANSMITTED VARIABLE RATE DATA IN A COMMUNICATIONS RECEIVER," issued on Oct. 15, 1996, assigned to the assignee of the present invention and incorporated by reference herein. Yet another rate determination mechanism is described in U.S. Pat. No. 5,751,725, entitled "METHOD AND APPARATUS FOR DETERMINING THE RATE OF RECEIVED DATA IN A VARIABLE RATE COMMUNICATION SYSTEM", issued May 12, 1998, assigned to the assignee of the present invention and incorporated by reference herein. In the exemplary embodiment, signaling information is transmitted on the fundamental channel using dim-and-burst and blank-and-burst formats as disclosed in the aforementioned U.S. Pat. No. 5,504,773.

XIII. Reverse Supplemental Channel

In the exemplary embodiment, the supplemental channel is used to support high speed data services. In the exemplary embodiment, the supplemental channel supports a plurality of data rates but the data rate does not change dynamically during a transmission. In the exemplary embodiment, the data rate on the supplemental channel is requested by remote station 6 and granted by base station 4.

XIV. Reverse Pilot/Control Channel

In the exemplary embodiment, the pilot and control information on the reverse link are time multiplexed on the pilot/control channel. In the exemplary embodiment, the control information comprises the physical layer control and MAC. In the exemplary embodiment, the physical layer control comprises the erasure indicator bits (EIBs) for the forward fundamental and supplemental channels, the forward power control bits, inter-cell Δ power levels, and inter-carrier power levels. In the exemplary embodiment, the MAC comprises the queue size which is indicative of the amount of information to be transmitted by remote station 6 on the reverse link and the current power headroom of remote station 6.

In the exemplary embodiment, two EIB bits are used to support the forward fundamental and supplemental channels. In the exemplary embodiment, each EIB bit indicates an erased frame received two frames back of the respective forward traffic channel for which the EIB bit is assigned. The discussion on the implementation and use of EIB transmission are disclosed in U.S. Pat. No. 5,568,483, entitled "METHOD AND APPARATUS FOR THE FORMATTING OF DATA FOR TRANSMISSION", assigned to the assignee of the present invention and incorporated by reference herein.

In the exemplary embodiment, the forward fundamental and/or supplemental channel can be transmitted from the "best" set of base stations 4. This takes advantage of space diversity and can potentially result in less required power for transmission on the forward traffic channels. The inter-cell Δ power levels is transmitted by remote station 6 on the pilot/control channel to indicate to base stations 4 the difference in the received power levels from the base stations 4 that remote station 6 observes. Base stations 4 use this information to determine the "best" set of base stations 4 for the purpose of transmitting the forward fundamental and supplemental channels.

In the exemplary embodiment, the inter-cell Δ power levels identify the pilot in the active set of remote station 6 with the highest energy-per-chip-to-interference ratio ($E_c/I_0$) and all pilots in the active set whose $E_c/I_0$ is within a predetermined power level (ΔP) of the pilot with the highest $E_c/I_0$. An exemplary method and apparatus for measuring pilot power level is disclosed in U.S. Pat. No. 5,903,554, entitled "METHOD AND APPARATUS FOR MEASURING LINK QUALITY IN A SPREAD SPECTRUM COMMUNICATION SYSTEM", issued May 11, 1999, assigned to the assignee of the present invention and incorporated by reference herein. In the exemplary embodiment, three bits are used to specify the index of the pilot (or the particular base station 4) with the highest $E_c/I_0$ in the active set. In the exemplary embodiment, the number of pilots within the active set is limited to six. Thus, a bit-map field of length five can be used to identify all pilots whose $E_c/I_0$ is within ΔP of the strongest pilot. For example, a "one" can indicate that the pilot assigned to a particular bit position is within ΔP of the strongest pilot and a "zero" can indicate that the pilot is not within ΔP of the strongest pilot. Therefore, a total of eight bits are utilized for the inter-cell Δ power levels. This is indicated in Table 3.

TABLE 5

| Description | # of Bits |
|---|---|
| Fundamental EIB | 1 |
| Supplemental EIB | 1 |
| Inter-Cell Δ Power Levels | 8 (3 + 5) |
| Inter-Carrier Power Levels | 12 (4 bits/carrier) |
| Queue Size | 4 |
| Power Headroom | 4 |

Figure 5:
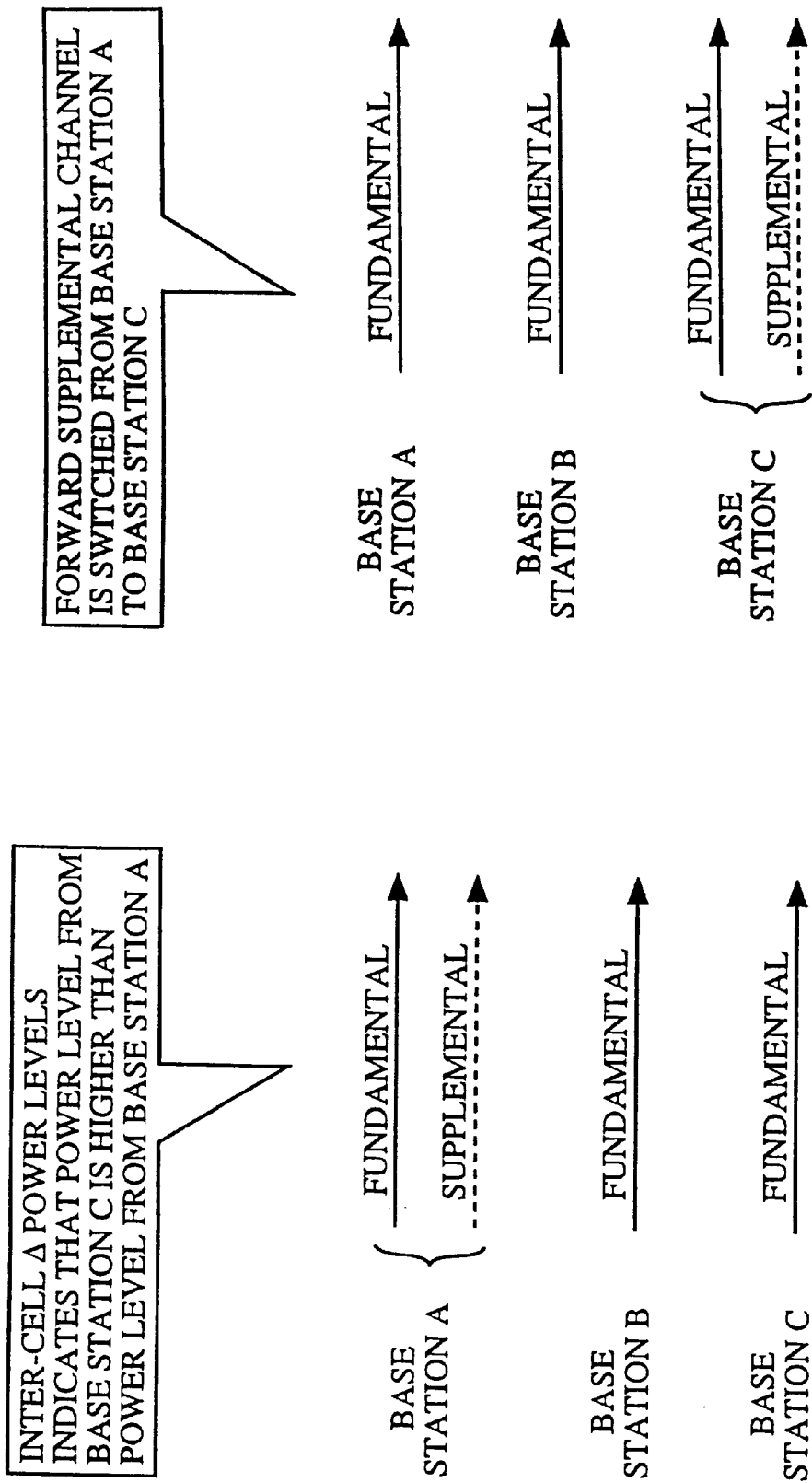
FIGS. 5A and 5B are exemplary diagrams which illustrate of the use of the inter-cell Δ power levels to control the forward supplemental channel transmission, respectively.

An exemplary illustration of the use of the inter-cell Δ power levels to control the forward supplemental channel transmission is shown in FIGS. 5A and 5B. Initially, in FIG. 5A, base station A transmits the fundamental and supplemental channels, base station B transmits the fundamental channel, and base station C transmits the fundamental channel. Remote station 6 measures the forward link power and determines that the power level received from base station C is higher than the power level received from base station A. Remote station 6 transmits the inter-cell Δ power levels to the base stations indicating this condition. The forward supplemental channel transmission is then switched from base station A to base station C in response thereto, as shown in FIG. 5B.

In the exemplary embodiment, the inter-carrier power levels is used to report the received power on each of the carriers. In the multi-carrier environment, different carriers may fade independently and it is possible that one or more of the carriers experience a deep fade while the remaining carriers are received significantly stronger. In the exemplary embodiment, remote station 6 can indicate the strength of the carriers using the inter-carrier power levels.

Figure 6:
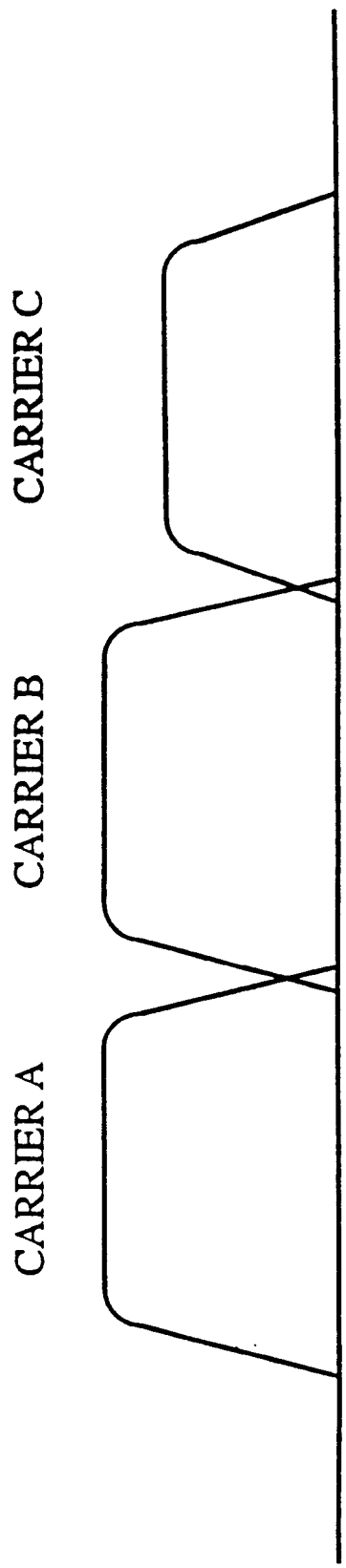
FIG. 6 is an exemplary diagram of the spectrum of the received multi-carrier signal.

An exemplary diagram of the spectrum of the received multi-carrier signal is shown in FIG. 6. It can be noted from FIG. 6 that carrier C is received weaker than carriers A an B. In the exemplary embodiment, the three carriers are power controlled together by the forward power control bits. Base stations 4 can use the inter-carrier power levels to assign different rates to each of the carriers. Alternatively, base stations 4 can use the inter-carrier power levels from remote station 6 to increase the transmit gain for the weaker carrier such that all carriers are received at the same energy-per-bit-to-interference ratio ($E_c/I_0$).

In the exemplary embodiment, a maximum of 16 rates for the reverse link require scheduling. Thus, 16 levels of quantization is sufficient to specify the power headroom of remote station 6. The maximum reverse link rate can be expressed as:

$$\text{Max\_Rate\_Possible} = \text{Current\_Reverse\_Rate} + \left(\frac{\text{Power\_Headroom}}{E_b\_\text{Required}}\right), \quad (1)$$

where $E_b$_Required is the energy-per-bit required for remote station 6 to transmit on the reverse link. From equation (1) and assuming that 4 bits are used by base station 4 to indicate the granted rate, a one-to-one relationship between the Max_Rate_Possible and Power_Headroom is possible if 4 bits are allocated to the power headroom parameter. In the exemplary embodiment, up to three carriers are supported. Thus, the inter-carrier power levels comprise 12 bits to identify the strength of each of the three carriers (4 bits per carrier).

Once base station 4 determines the granted rate, the duration of the reverse link rate assignment can be computed using the queue size information from remote station 6 through the following relationship:

$$\text{Queue\_Size} = \text{Reverse\_Rate} * \text{Assignment\_Duration} \quad (2)$$

Therefore, the granularity of the queue size should be the same as the granularity with which base station 4 uses to specify the duration of the rate assignment (e.g., 4 bits).

The above discussion assumes a maximum of 16 rates which require scheduling and a maximum of three carriers. Different number of bits can be used to support different number of carriers and rates and are within the scope of the present invention.

XV. Timing and Scheduling

As stated above, the control information is time-multiplexed with the pilot data. In the exemplary embodiment, the control information is spread within a frame such that continuous transmission occurs. In the exemplary embodiment, each fame is further divided into four equal control frames. Thus, for a 20 msec frame, each control frame is 5 msec in duration. The partition of a forward channel frame into different number of control frames can be contemplated and is within the scope of the present invention.

Figure 7A:
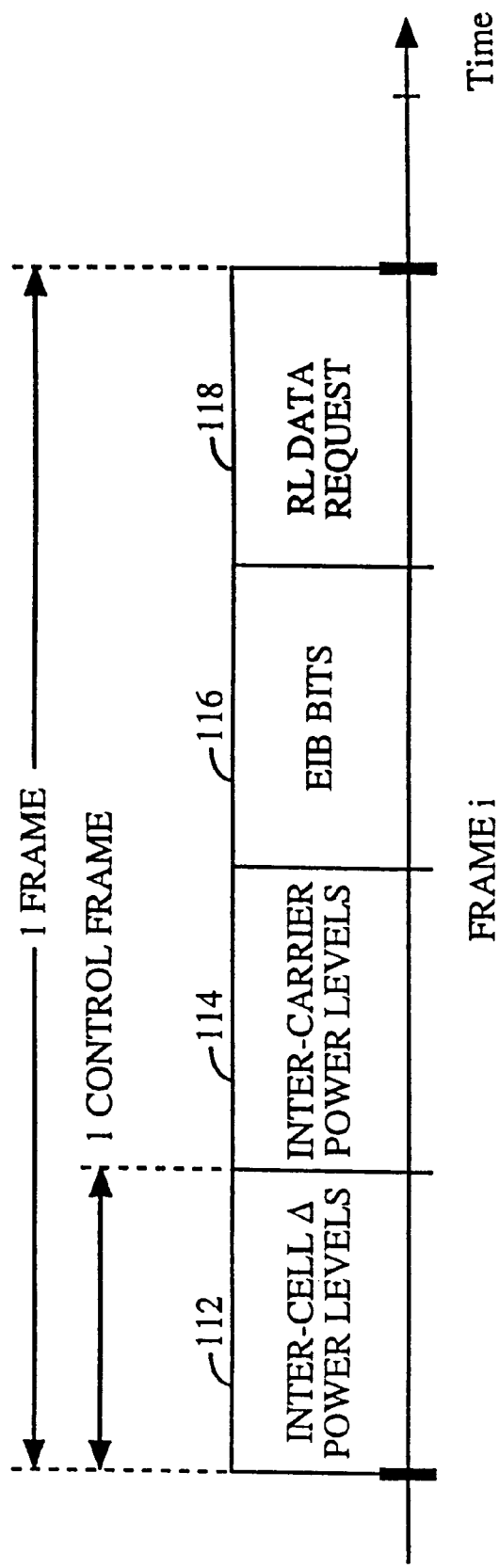
FIG. 7A is a diagram of an exemplary reverse link pilot/control channel frame format.

A diagram of an exemplary reverse link pilot/control channel frame format is shown in FIG. 7A. In the exemplary embodiment, inter-cell Δ power levels 112 is transmitted in the first control frame of a frame, inter-carrier power levels 114 is transmitted in the second control frame, EIB bits 116 are transmitted in the third control frame, and reverse link rate request (RL rate request) 118 is transmitted in the fourth control frame.

Figure 7B:
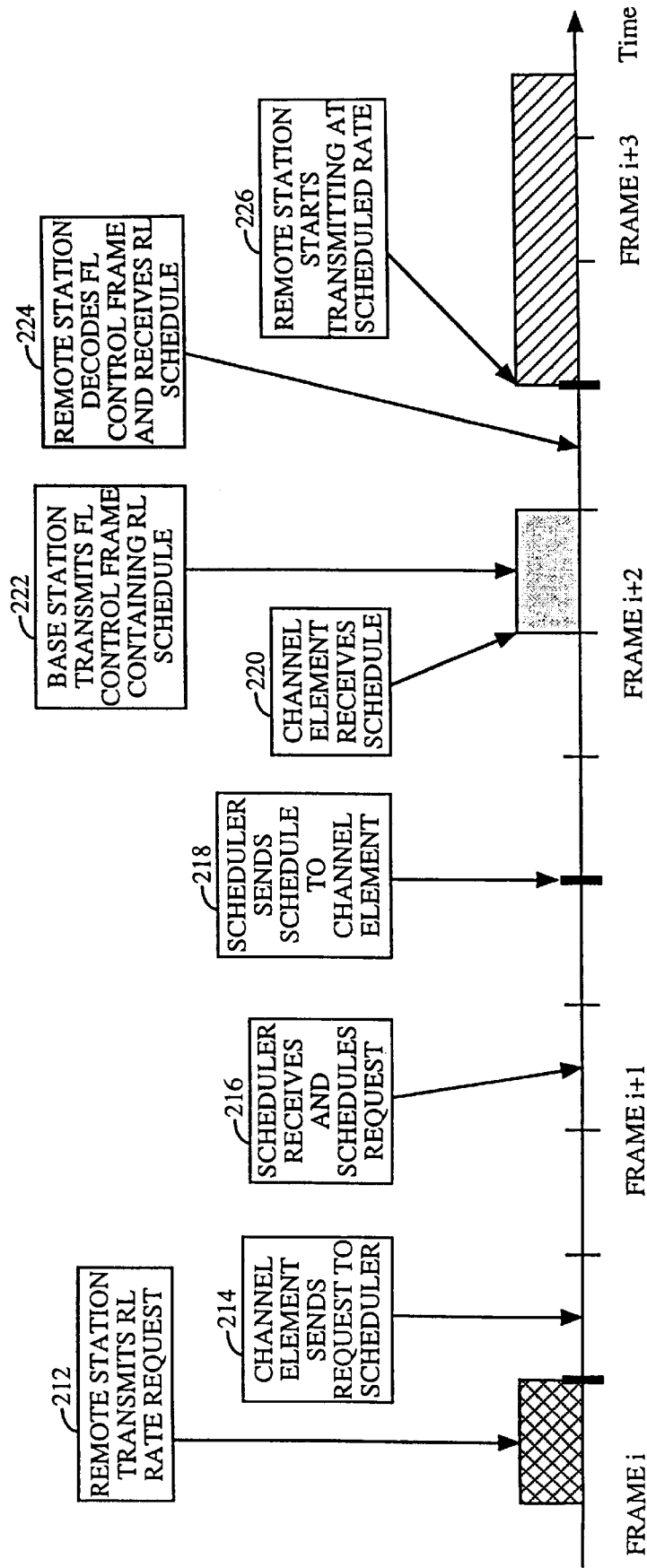
FIG. 7B is an exemplary timing diagram illustrating the reverse link high speed data transmission.

An exemplary timing diagram illustrating the reverse link high speed data transmission is shown in FIG. 7B. Remote station 6 transmits the RL rate request in the fourth control frame of frame i to base station 4, at block 212. In the exemplary embodiment, the RL rate request comprises the 4-bit queue size and the 4-bit power headroom as described above. Channel element 42 receives the request and sends the request, along with the $E_b/N_0$ required by remote station 6, to scheduler 12 within the first control frame of frame i+1, at block 214. Scheduler 12 receives the request in the third control frame of frame i+1, at block 216, and schedules the request. Scheduler 12 then sends the schedule to channel element 42 in the first control frame of frame i+2, at block 218. Channel element 42 receives the schedule in the third control frame of frame i+2, at block 220. The forward link control frame containing the reverse link schedule is transmitted to remote station 6 in the third control frame of frame i+2, at block 222. Remote station 6 receives the reverse link schedule within the fourth control frame of frame i+2, at block 224, and starts transmitting at the scheduled rate in frame i+3, at block 226.

Figure 7C:
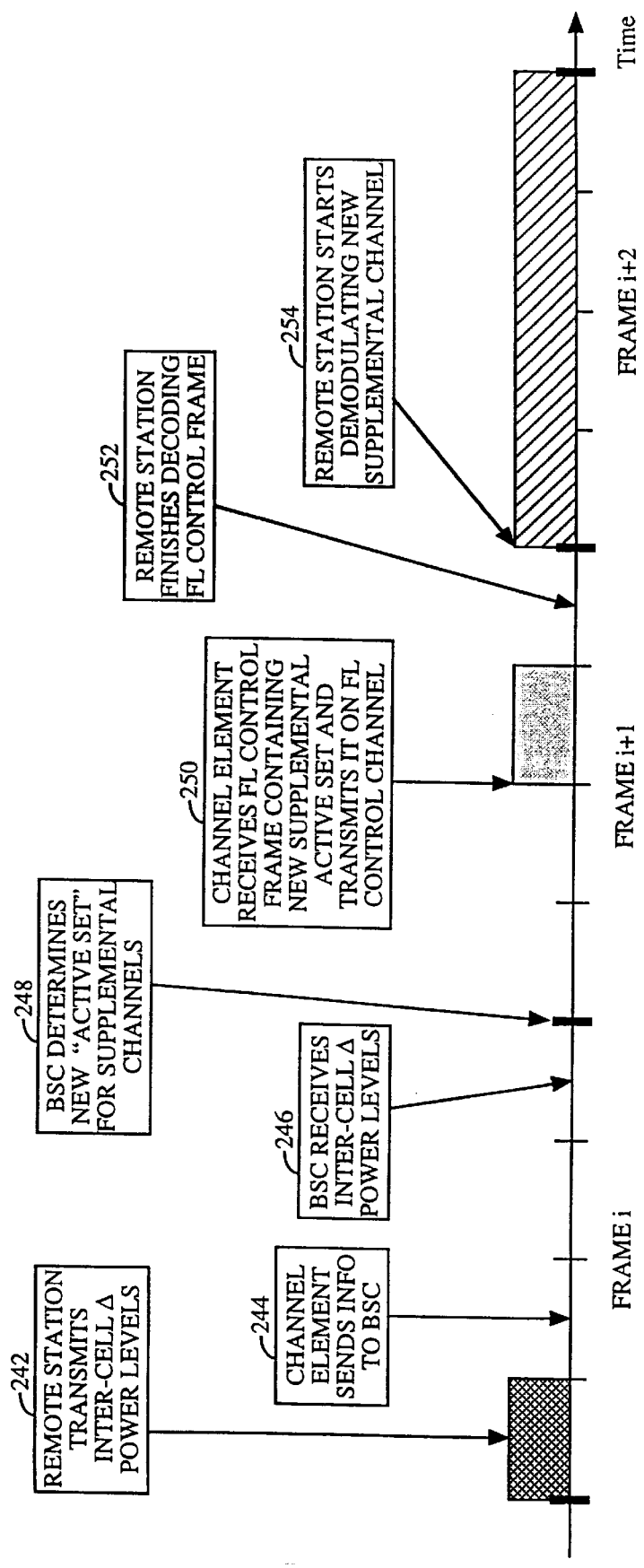
FIG. 7C is an exemplary timing diagram illustrating the use of inter-cell Δ power levels.

Base station 4 uses the inter-cell Δ power levels, which is transmitted in the first control frame by remote station 6, to select the base stations 4 from which the supplemental channel is transmitted. An exemplary timing diagram illustrating the use of inter-cell Δ power levels is shown in FIG. 7C. Remote station 6 transmits the inter-cell Δ power levels in the first control frame of frame i to base station 4 at block 242. Channel element 42 receives the inter-cell Δ power levels and sends the information to base station controller (BSC) 10 in the second control frame of frame i, at block 244. Base station controller 10 receives the information in the fourth control frame of frame i, at block 246. Base station controller 10 then determines the new active set for the supplemental channels in the first control frame of frame i+1, at block 248. Channel element 42 receives the forward link control channel frame containing the new supplemental active set and transmits it on the forward link control channel at the third control frame of frame i+1, at block 250.

Remote station 6 finishes decoding the forward link control channel frame within the fourth control frame of frame i+1, at block 252. Remote station 6 starts demodulating the new supplemental channel at frame i+2, at block 254.

Figure 7D:
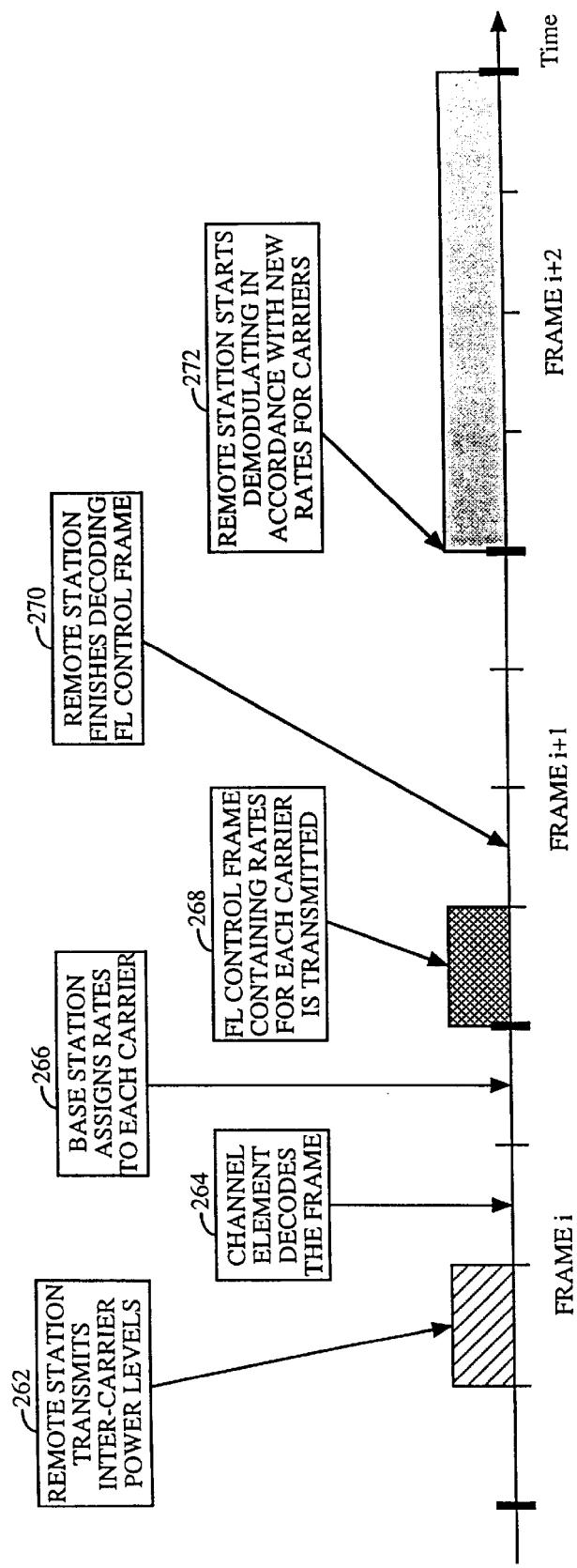
FIG. 7D is an exemplary timing diagram illustrating the use of inter-carrier power levels.

Base station 4 uses the inter-carrier power levels, which is transmitted in the second control frame by remote station 6, to assign rates to each of the carriers to support remote station 6. An exemplary timing diagram illustrating the use of inter-carrier power levels is shown in FIG. 7D. Remote station 6 transmits the inter-carrier power levels in the second control frame of frame i to base station 4, at block 262. Channel element 42 decodes the frame in the third control frame of frame i, at block 264. Base station 4 receives the inter-carrier power levels and assigns rates to each of the carriers in the fourth control frame of frame i, at block 266. In the exemplary embodiment, the inter-carrier power levels is not routed through the backhaul. Therefore, the appropriate action can take effect in the next frame after receiving the inter-carrier power levels. The forward link control channel frame containing rates for each of the carriers is transmitted in the first control frame of frame i+1, at block 268. Remote station 6 finishes decoding the forward link control channel frame in the second control frame of frame i+1, at block 270. Remote station 6 starts demodulating in accordance with the new rates for the carriers in frame i+2, at block 272.

Figure 7E:
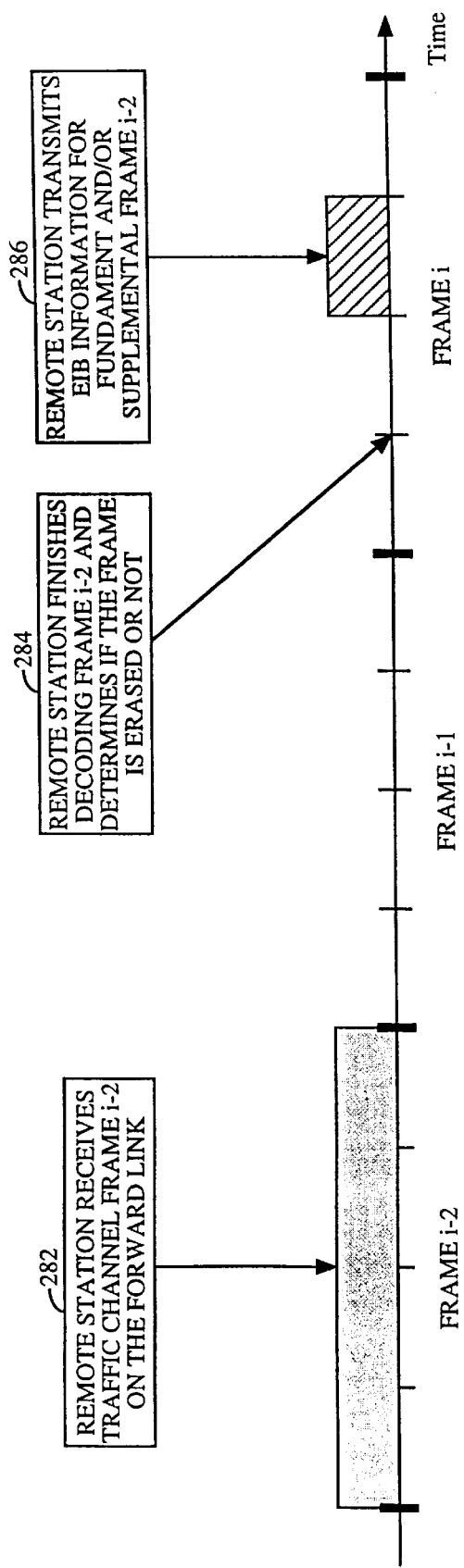
FIG. 7E is an exemplary timing diagram illustrating the transmission of the EIB bits.

In the exemplary embodiment, the EIB bits are transmitted in the third control frame on the pilot/control channel to indicate an erased frame received on the fundamental and supplemental channels by remote station 6. In the exemplary embodiment, the EIB bits can be used by high speed data services as a layer-2 acknowledgment (ACK) or negative acknowledgment (NACK) in place of the NACK radio link protocol (RLP) frames defined by the IS-707 standard entitled "TIA/EIA/IS-707 DATA SERVICE OPTIONS FOR WIDEBAND SPREAD SPECTRUM SYSTEMS". The EIB bits of the present invention are shorter and have less processing delays than the NACK RLP frames. An exemplary timing diagram illustrating the transmission of the EIB bits is shown in FIG. 7E. Remote station 6 receives data on the traffic channel on the forward link in frame i−2, at block 282. Remote station 6 finished decoding frame i−2 and determines whether the data frame is erased or not in the first control frame of frame i, at block 284. The EIB bits indicative of the condition of the data frames received in frame i−2 on the forward traffic channel are transmitted by remote station 6 in the third control frame of frame i, at block 286.

The reverse link pilot/control channel frame format as described above is an exemplary format which minimizes the processing delays for the processes which utilize the information contained in the pilot/control channel frame. For some communication systems, some of the information described above are not applicable nor required. For example, a communication system which operates with one carrier does not require the inter-carrier power levels. For other communication systems, additional information are utilized to implement various system functions. Thus, pilot/control channel frame formats containing different information and utilizing different ordering of the information can be contemplated and are within the scope of the present invention.

XVI. Remote Station Operating Modes

In the exemplary embodiment, to more fully utilize the available forward and reverse link capacity, the traffic channels are released during periods of inactivity. In the exemplary embodiment, remote station 6 operates in one of three modes: traffic channel mode, suspended mode, and dormant mode. The transition into and out of each mode is dependent on the length of the inactivity period.

Figure 8A:
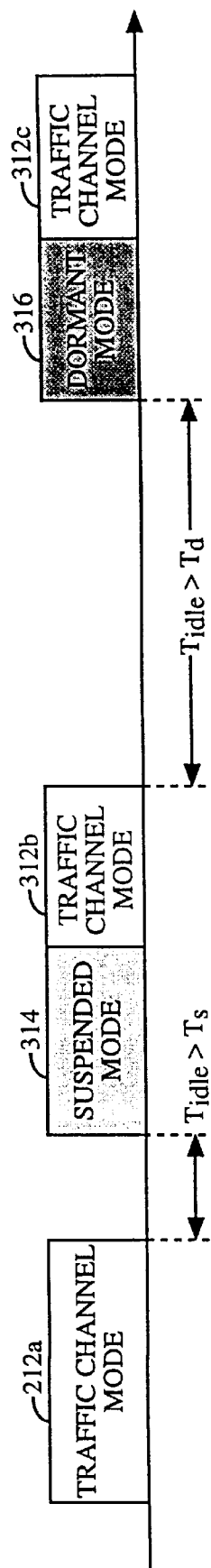
FIGS. 8A–8B are exemplary timing diagrams showing the transitions to the suspended and dormant modes and exemplary state diagram showing the transitions between the various operating modes, respectively.
Figure 8B:
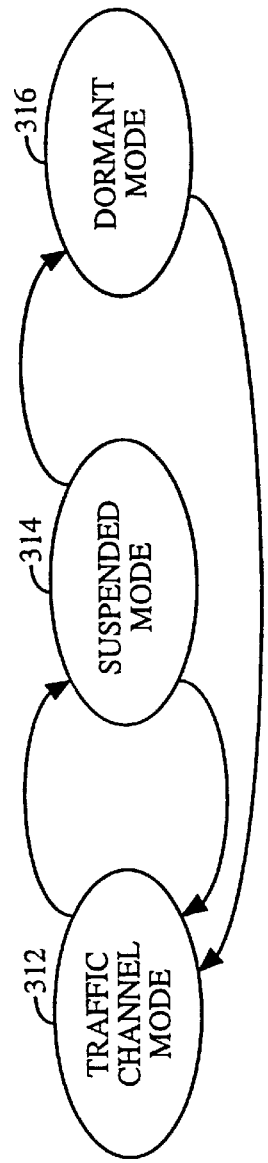

An exemplary timing diagram showing the transitions to the suspended and dormant modes is shown in FIG. 8A and an exemplary state diagram showing the transitions between the various operating modes is shown in FIG. 8B. The traffic (or activity) in the forward and/or reverse traffic channels is represented by remote station 6 being in the traffic channel mode 312*a*, 312*b*, and 312*c* in FIG. 8A and traffic channel mode 312 in FIG. 8B. The period of inactivity, denoted as $T_{idle}$, is the time duration since the termination of the last data transmission. In the exemplary embodiment, if the period of inactivity exceeds a first predetermined idle period $T_s$, remote station 6 is placed in suspended mode 314. Once in suspended mode 314, if the period of inactivity exceeds a second predetermined idle period $T_d$, where $T_d > T_s$, remote station 6 is placed in dormant mode 316. In either suspended mode 314 or dormant mode 316, if base station 4 or remote station 6 has data to communicate, remote station 6 can be assigned a traffic channel and brought back to traffic channel mode 312 (as shown in FIG. 8B). In the exemplary embodiment, $T_s$ is selected to be approximately one second and $T_d$ is selected to be approximately 60 seconds, although other values for $T_s$ and $T_d$ can be selected and are within the scope of the present invention.

XVII. Remote Station Suspended Mode

Remote station 6 enters the suspended mode after the period of inactivity exceeds a first predetermined idle period $T_s$. In the exemplary embodiment, in the suspended mode, the traffic channel is released but the state information is retained by both remote station 6 and base station 4 so that remote station 6 can be brought back to the traffic channel mode in a short time period. In the exemplary embodiment, the state information which is stored in the suspended mode comprises the RLP state, the traffic channel configuration, the encryption variables, and the authentication variables. These state information are defined by the IS-95 and the IS-707 standards. The traffic channel configuration can comprise the service configuration, the connected service options and their characteristics, and power control parameters. Since the state information are stored, remote station 6 can be brought back to the traffic channel mode and assigned a traffic channel after reception of a channel assignment message.

Figure 8C:
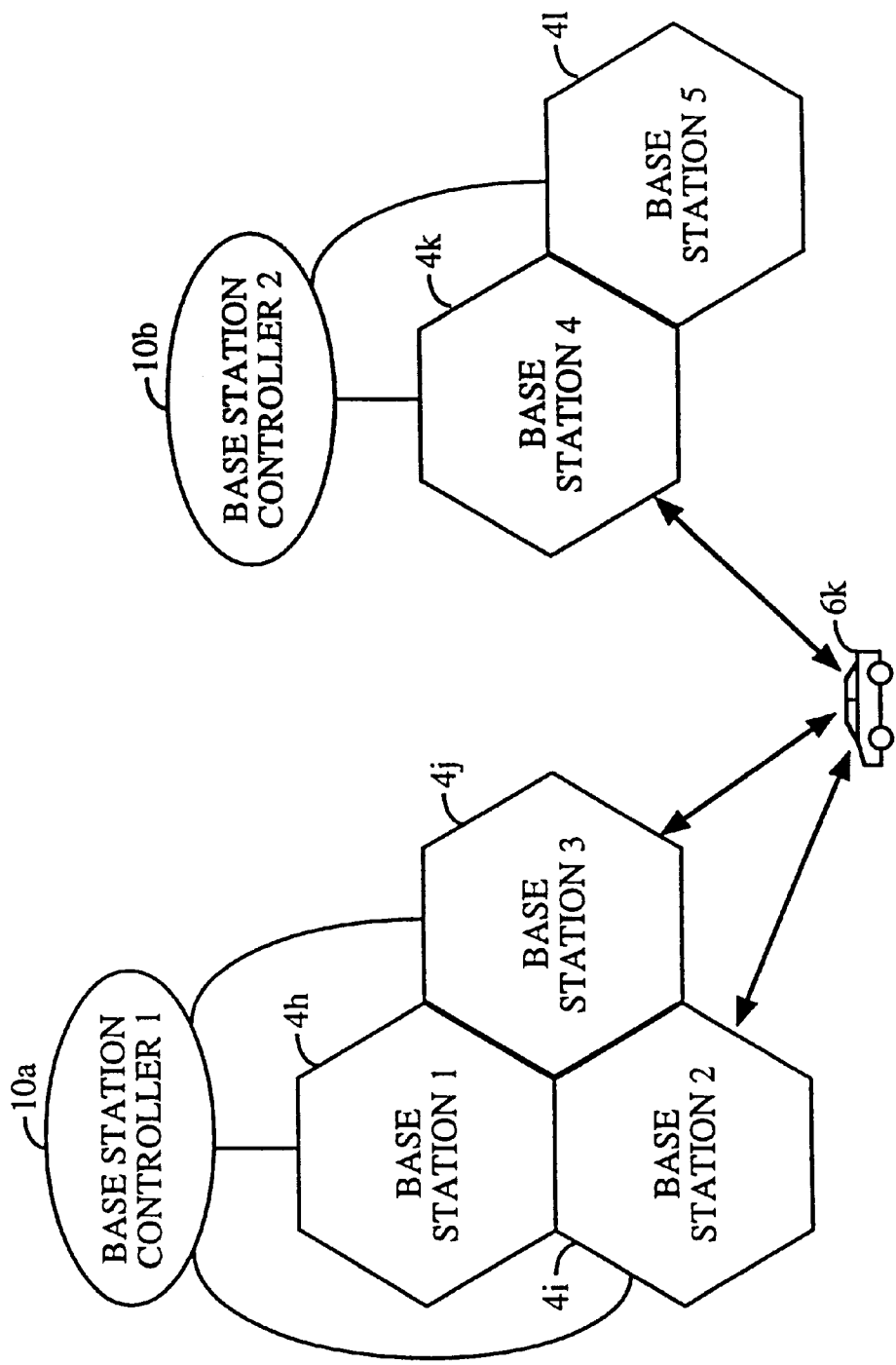
FIG. 8C is an exemplary diagram showing a scenario wherein a remote station operating in the suspended mode sends a location update message upon detecting a new pilot.

In the exemplary embodiment, while in the suspended mode, remote station 6 continuously monitor the paging channel in the non-slotted mode and processes the overhead messages which are broadcast to all remote stations 6 on the paging channel. Remote station 6 may send location update messages to base station 4 in order to inform base station controller 10 of its current location. An exemplary diagram showing a scenario wherein remote station 6*k*, which operates in the suspended mode, sends a location update message upon detecting a new pilot is shown in FIG. 8C. Remote station 6*k* receives the pilots from base stations 4*i* and 4*j* and the new pilot from base station 4*k*. Remote station 6*k* then transmits a location update message on the reverse link which is received by base stations 4*i*, 4*j*, and 4*k*. Remote station 6*k* can also send a suspended location update message if the pilot from one of the base stations 4 drops below a predetermined threshold. In the exemplary embodiment, the suspended location update message is transmitted on the access channel.

In the exemplary embodiment, the location update messages are routed to base station controllers 10 by base stations 4. Thus, base station controller 10 is constantly aware of the location of remote station 6 and can compose a channel assignment message and bring remote station 6 to the traffic channel mode in the soft handoff mode.

XVIII. Remote Station Dormant Mode

In the exemplary embodiment, remote station 6 monitors the paging channel in slotted mode while in the dormant mode to conserve battery power. In the exemplary embodiment, the dormant mode is similar to that defined by IS-707 standard.

In the exemplary embodiment, no call related state information is retained by base station 4 nor remote station 6 in the dormant mode and only the state of the point-to-point protocol (PPP) is maintained by remote station 6 and base station 4. As a result, remote station 6 and base station 4 traverse through the call setup process (which comprises the page, page response, and channel assignment) before remote station 6 is assigned a traffic channel and brought back to the traffic channel mode.

XIX. Transition to Traffic Channel Mode

Figures 9A, 9B, 9C, 9D:
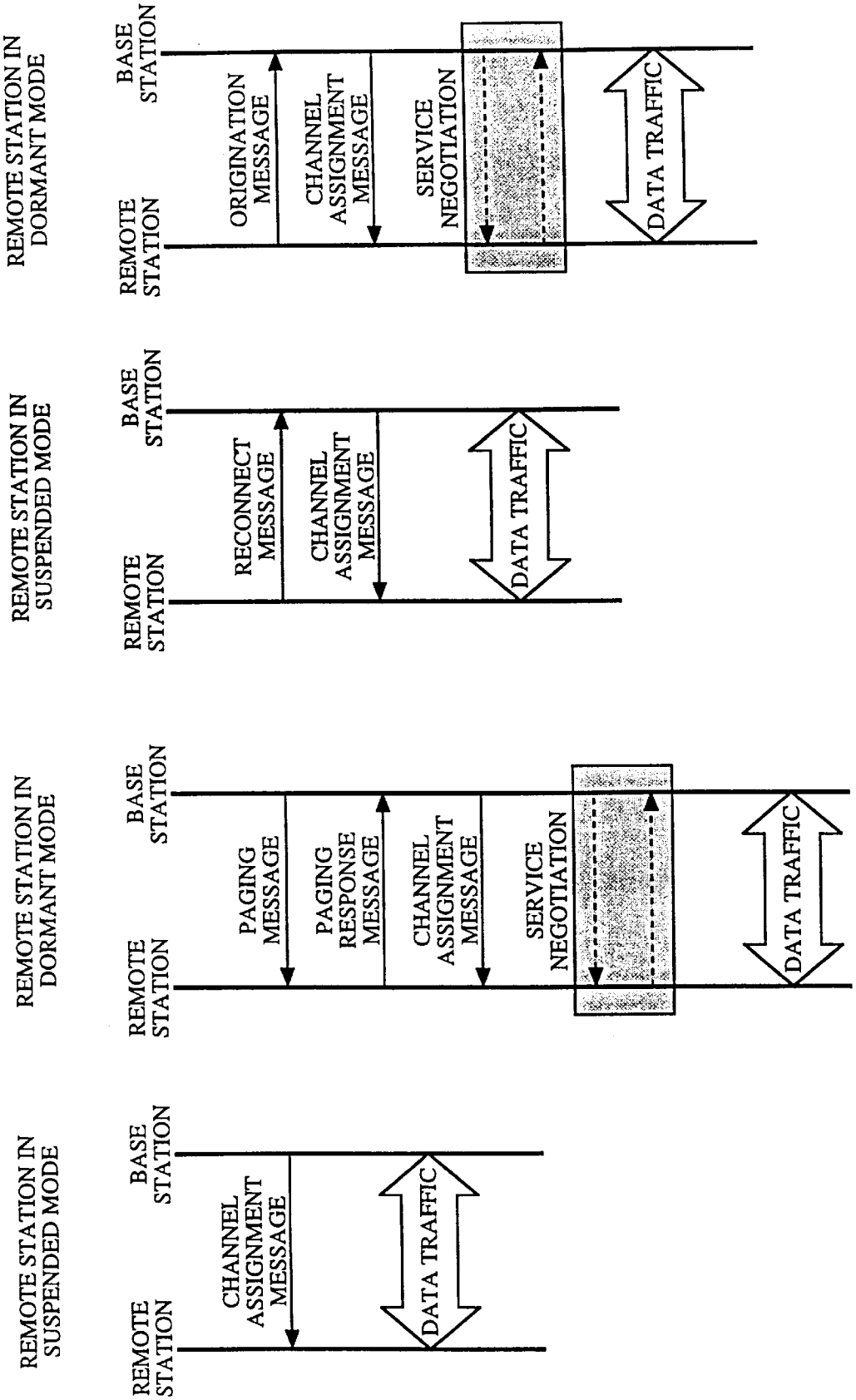
FIGS. 9A–9B are exemplary diagrams illustrating the protocol for a base station initiated transitions from the suspended and dormant modes to the traffic channel mode, respectively.
FIGS. 9C–9D are exemplary diagrams illustrating the protocol for a remote station initiated transitions from the suspended and dormant modes to the traffic channel mode, respectively.

In the exemplary embodiment, the transitions of remote station 6 from the suspended or dormant mode to the traffic channel mode can be initiated by either base station 4 or remote station 6. The exemplary diagrams illustrating the protocol for a base station initiated transitions from the suspended and dormant modes to the traffic channel mode are shown in FIGS. 9A and 9B, respectively. Base station 4 initiates the process if it has data to communication to remote station 6. If remote station 6 is in suspended mode (see FIG. 9A), base station 4 transmits a channel assignment message on the paging channel and data transmission can occur shortly thereafter. If remote station 6 is in the dormant mode (see FIG. 9B), base station 4 first transmit a paging message on the paging channel. Remote station 6 receives the paging message and transmits a page response message in acknowledgment. Base station 4 then transmits the channel assignment message. After a series of service negotiation messages, the call set up is completed and data transmission can occur thereafter. As shown in FIGS. 9A and 9B, the transition from the suspended mode to the traffic channel mode is quicker than the transition from the dormant mode to the traffic channel mode because the state of the call is maintained by both remote station 6 and base station 4.

The exemplary diagram illustrating the protocol for the remote station initiated transitions from the suspended and dormant mode to the traffic channel mode are shown in FIGS. 9C and 9D, respectively. Remote station 6 initiates the process if it has data to communicate to base station 4. If remote station 6 is in the suspended mode (see FIG. 9C), remote station 6 transmits a reconnect message to base station 4. Base station 4 then transmits a channel assignment message and data transmission can occur shortly thereafter. If remote station 6 is in the dormant mode (see FIG. 9D), remote station 6 first transmits an origination message to base station 4. Base station 4 then transmits the channel assignment message. After a series of service negotiation messages, the call set up is completed and data transmission can occur thereafter.

The present invention has been described by a number of physical channels which facilitate communication of the plurality of logical channels described above. Other physical channels can also be utilized to implement additional functions which may be required for the communication system wherein the channels are used. Furthermore, the physical channels described above can be multiplexed and/or combined such that the required functions can be performed and these various combinations of the physical channels are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system in which a remote station is receiving fundamental channel data from a plurality of base stations, a method for performing soft handoff in the transmission of supplemental channel data, comprising the steps of:

measuring the strength of signals from said plurality of base stations at said mobile station;

determining the strength of a strongest signal from said plurality of base stations;

comparing the strength of signals of a remaining set base stations to the strength of said strongest signal;

determining whether said strengths of signals of a remaining set base stations is within a predetermined energy threshold of the strength of said strongest signal;

transmitting a message indicative of said determination from said remote station;

selecting at least one base station from said plurality of base stations to transmit said supplemental channel data to said remote station in accordance with said message;

transmitting said supplemental channel data to said remote station from said selected at least one base station.

2. The method of claim 1 wherein said message comprises:

a signal indicative of the strength of said strongest signal; and a plurality of signals corresponding to each of said base stations in said remaining set and wherein each signal is indicative as to the base stations in said remaining set which are within said predetermined threshold of said strongest signal.

3. The method of claim 2 wherein said signal indicative of the strength of said strongest signal comprises three bits; and wherein each of said plurality signals comprises a single bit corresponding to each base station in said set of remaining base stations, indicative as to whether the energy of said signal of said corresponding base station is within said predetermined threshold of said strongest signal.

4. The method of claim 1 wherein said remote station is capable of receiving signals on a plurality of carrier frequencies, said method further comprising the steps of:

measuring signal energies of signals on each of said plurality of carrier frequencies; and transmitting a message indicative of said measured energies of said plurality of carrier frequencies; and wherein said step of selecting is performed in accordance with said message indicative of said measured energies of said plurality of carrier frequencies.

* * * * *